United States Patent Office 3,372,774
Patented Mar. 12, 1968

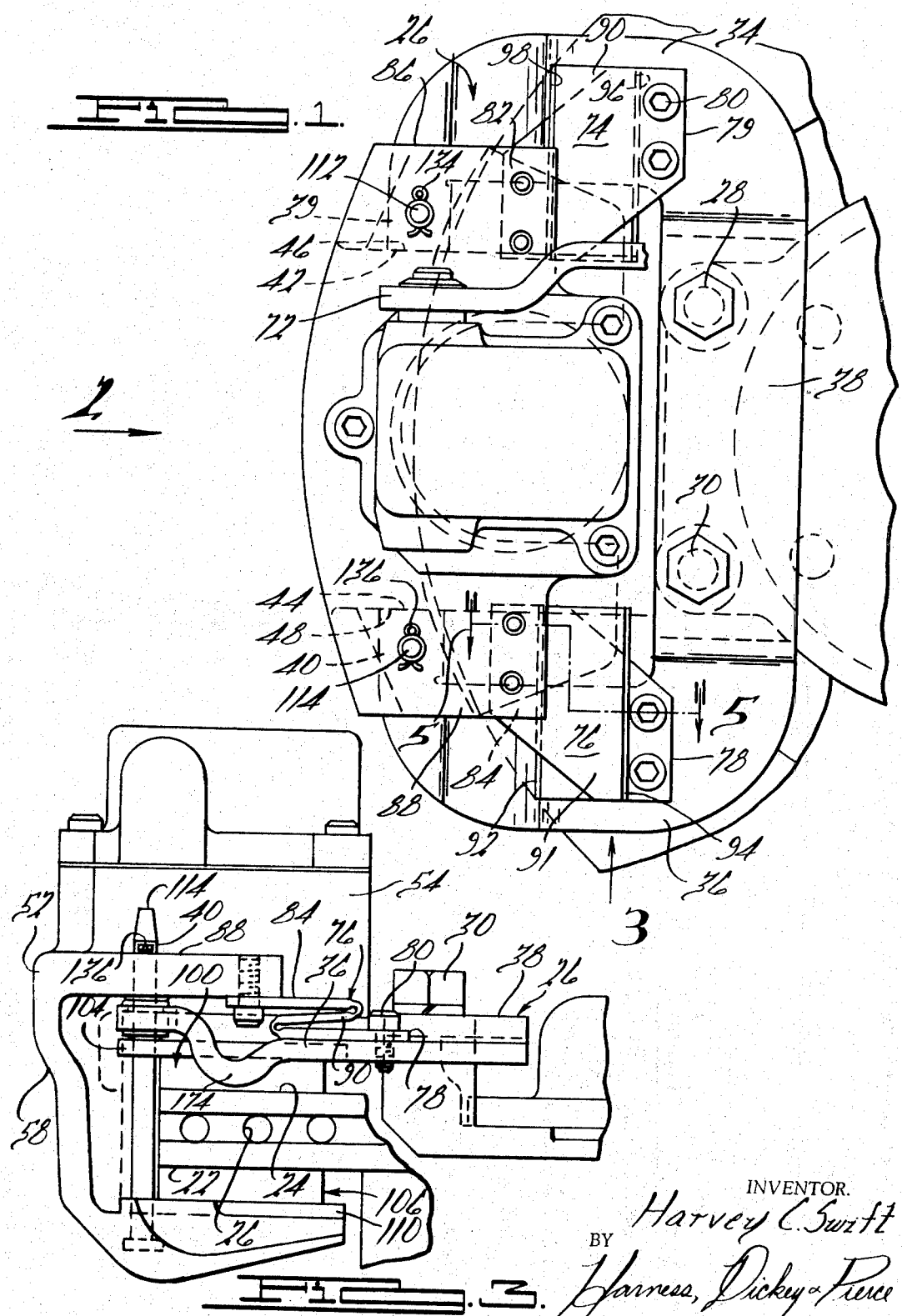

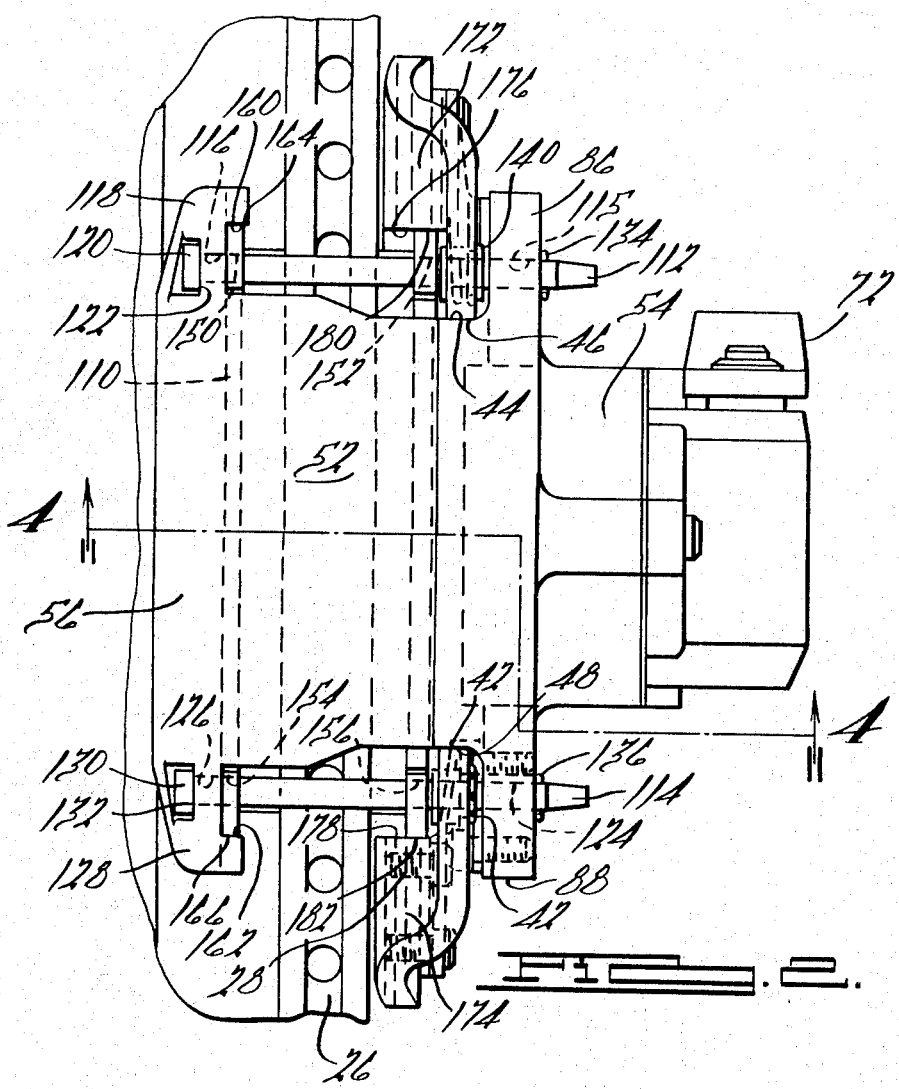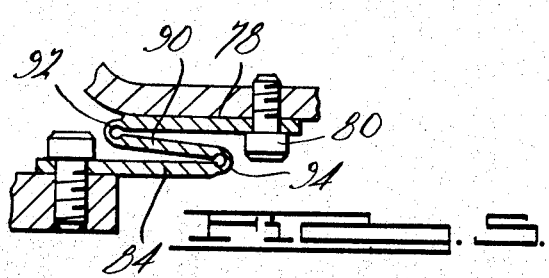

3,372,774
FLEXIBLE SUPPORT MEANS FOR A
BRAKE CALIPER
Harvey C. Swift, Birmingham, Mich., assignor to Kelsey-Hayes Company, Romulus, Mich., a corporation of Delaware
Filed Dec. 19, 1966, Ser. No. 602,794
15 Claims. (Cl. 188—73)

ABSTRACT OF THE DISCLOSURE

This invention relates to a disk brake and mort particularly to a disk brake having novel means for supporting a slidable caliper upon a stationary torque plate. This invention relates generally to a disk brake of the sliding caliper type in which a caliper having a fluid motor portion and a reaction portion is mounted on a stationary torque plate by yieldable means in the form of flex straps. A piston is mounted in the fluid motor portion of the caliper for moving a brake shoe having a brake lining thereon into engagement with a braking face of a rotary disk that is attached to a wheel to be braked. When this happens, the reaction portion of the caliper moves the other brake shoe so that the lining positioned thereon moves into engagement with the other face of the disk to be braked. Relative movement between a stationary torque plate and the caliper in a direction perpendicular to the plane of rotation of the disk is permitted by the use of the flex straps that not only permit such movement but also support the caliper upon the stationary torque plate.

There have been many proposals in the prior art for providing yieldable means, such as, flex straps, to support the caliper on the stationary torque plate. The present invention provides a pair of spaced flexible straps that have hinges mounted so that the axes thereof extend in a vertical direction, thereby permitting movement of the caliper on the stationary torque plate in a direction generally perpendicular to the plane of the disk to be braked and, furthermore, provides column strength for supporting the caliper on the torque plate. The two flex straps for accomplishing the above-mentioned purposes are located closely adjacent the plane of one of the brake shoes, more particularly, adjacent the brake shoe that is motivated by the piston positioned in the fluid motor portion of the caliper. This minimizes twisting of the caliper with respect to the torque plate that might otherwise occur and, as a result, uneven wear of the brake shoes is minimized by the use of this structure. This structure also provides the advantage that additional means are not required to resist and minimize this twisting couple. As a result, the present invention provides an economical, uncomplicated and efficient disk brake of the sliding caliper type.

An object of the present invention is the provision of an economical, efficient and inexpensive disk brake.

A further object of the invention is the provision of an inexpensive and uncomplicated disk brake of the sliding caliper type in which a flexible strap that mounts the sliding caliper upon a stationary torque plate is located in a position to minimize twisting of the caliper with respect to the torque plate.

Other objects and attendant advantages of the present invention may be more readily realized as the specification is considered in connection with the attached drawings, in which:

FIG. 1 is a rear elevational view of the disk brake of the present invention;

FIG. 2 is an end elevational view taken in the direction of the arrow 2;

FIG. 3 is a bottom elevational view taken in the direction of the arrow 3;

FIG. 5 is a sectional view taken along the lines 5—5 of FIG. 1.

Figure 4:
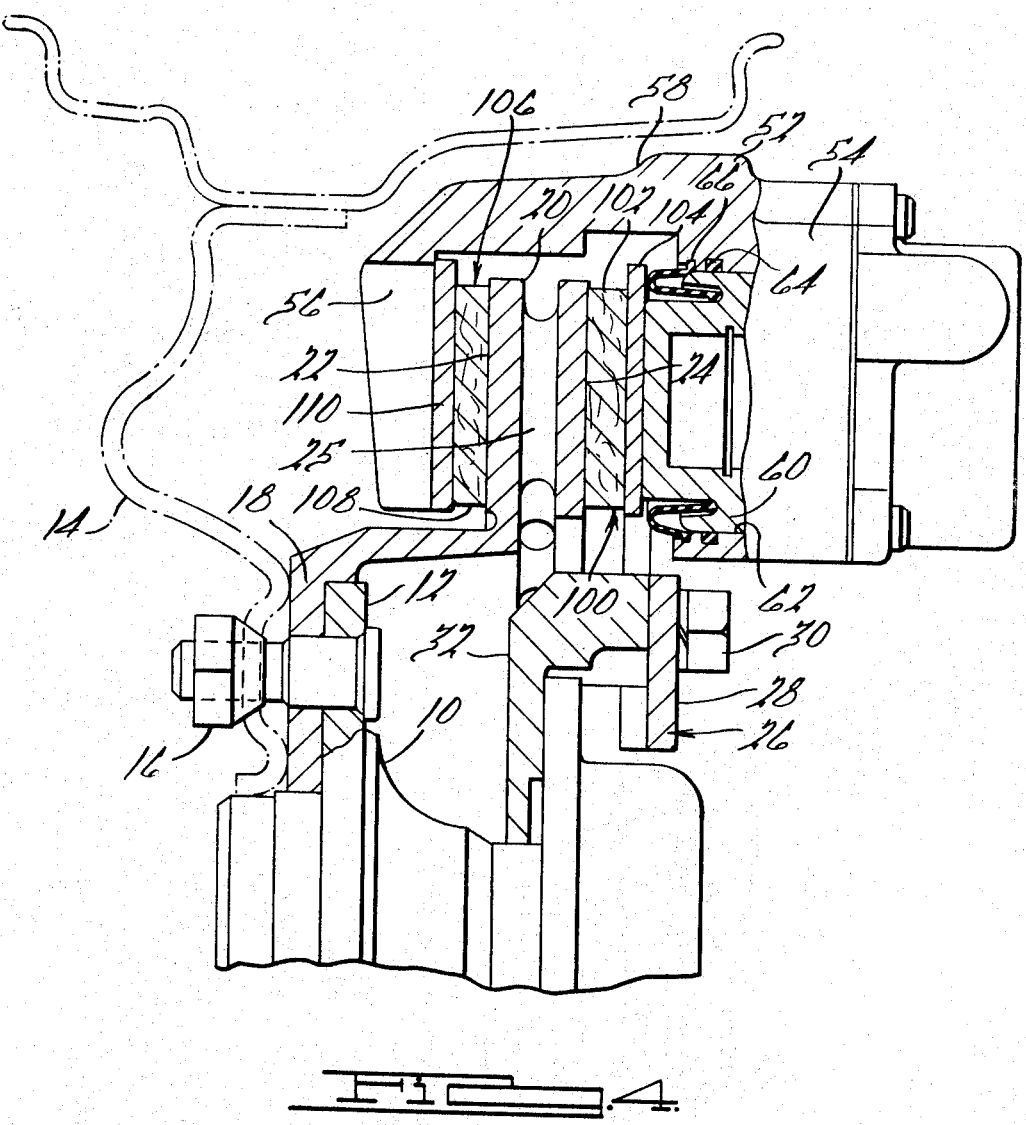
FIG. 4 is a sectional view taken along the lines 4—4 of FIG. 2.

Referring now to the drawings in which like reference numerals designate like parts throughout the several views thereof, there is shown in FIG. 4 a rotatable hub 10 having an attaching flange 12 formed integrally therewith. A wheel 14 is attached to the attaching flange 12 by means of a nut and bolt assembly, one of which is shown at 16. The attaching means 16 also attaches an attaching flange 18 of a rotatable disk 20 to the attaching flange 12. The rotatable disk 20 has a first braking surface 22, a second braking surface 24, and radially extending bores 26 connected by webs 28 to provide the conventional ventilation and cooling of the disk as it is rotated.

A generally C-shaped stationary torque plate 26 is attached by means of bolts 28 and 30 to a stationary member 32 that forms a portion of the steering knuckle or other stationary part of a hub and wheel assembly. As can best be seen by reference to FIGS. 1, 2 and 3, this stationary torque plate has an upper arm 34 and a lower arm 36 which are integrally formed with a main body portion 38 that provides the means for the attachment of the stationary torque plate 26 to the stationary member 32 by means of the bolts 28 and 30. These arms 34 and 36 are spaced axially inwardly of the main body portion 38. The arms 34 and 36 have reduced portions 39 and 40, respectively, having inwardly spaced shoulders 42 and 44 formed thereon which are positioned to be engageable with outwardly facing shoulders 46 and 48 on a caliper or housing 52. The reduced portions 38 and 40 are positioned in the same plane as the main body portion 38.

The caliper 52 includes a fluid motor portion 54, a reaction portion 56 and an interconnecting portion 58 that interconnects the fluid motor portion 54 with the reaction portion 56. A conventional piston 60 is mounted in a bore 62 in the fluid motor portion 54 of the caliper 52 for reciprocation therein when hydraulic fluid under pressure is applied to the rear of the piston. A conventional O-ring seal 64 of generally rectangular cross section provides a seal between the outer wall of the piston 60 and the cylinder wall 62, while a conventional boot 66 is attached at one end to the caliper 52 and at the other end to the piston 60.

The piston 60 is also adapted to be actuated by a lever 72, shown in FIG. 2, that is employed and forms a part of a hand brake actuating mechanism. This hand brake actuating mechanism contained within the fluid motor portion 54 of the caliper 52 is conventional in nature and therefore a detailed description thereof is considered to be unnecessary.

The stationary torque plate 26 is coupled to the caliper 52 by means of a pair of flexible straps 74 and 76 which are shown in elevation in FIG. 1. The flexible strap 74 comprises a first planar portion 78 attached to the arm 36 of the torque plate via bolts 80, while the flexible strap 76 also has a first planar portion 79 connected to the arm 34. Second planar portions 82 and 84 of the flexible straps 74 and 76, respectively, are attached to the inner surfaces of outwardly extending flanges 86 and 88 positioned on the fluid motor portion 54 of the caliper 52. The flex straps 74 and 76, as can best be seen by reference to FIGS. 3 and 5, comprise intermediate portions 91 and 90, respectively, interconnecting the planar portions 78 and 84 of the flex strap 76, and 79, 82 of the flex strap 74. Hinges 92 and 94 interconnect these two planar portions of the flex strap 76 with the intermediate portion 91 while similar hinges 96 and 98 interconnect the planar portions 79 and 82 of the flex straps 74.

As best seen by reference to FIG. 1, the axes of the hinges of each of the flex straps 74 and 76 are located in spaced vertical lines and they thereby permit the movement of the caliper 52 with respect to the torque plate 26 in a direction generally perpendicular to the plane of rotation of the disk 20.

A first brake shoe 100 having a brake lining 102 suitably affixed to a backing plate 104 is positioned so that the brake lining 102 engages the face 24 of the rotatable disk 20 when the piston 60 is actuated and moves the backing plate 104 and the lining 102 to the left, as shown in FIG. 4. Similarly, a brake shoe 106 having a brake lining 108 and a backing plate 110 is positioned adjacent the reaction portion 56 of the caliper 52 so that during braking operations, when the reaction portion 56 is moved to the right, as shown in FIG. 4, it will force the brake lining 108 into engagement with the face 22 of the rotatable disk 20 with braking force.

The brake shoes 100 and 106 are supported on the caliper 52 by means of a pair of spaced pins 112 and 114. The pin 112 extends through an aperture 115 positioned in the flange 86 in the fluid motor portion 54 of the caliper 52. It also extends through an aperture 116 that is axially aligned with the aperture 115 positioned in an outwardly extending flange 118 positioned on the reaction portion 56 of the caliper 52. The pin 112 has a head 120 positioned in engagement with a shoulder 122 of the flange 118.

Similarly, the pin 114 extends through an aperture 124 positioned in the flange 88 of the fluid motor portion 54 of the caliper 52. This pin also extends through an axially aligned aperture or bore 126 formed in another outwardly extending flange 128 formed on the reaction portion 56 of the caliper 52. This pin also has a head 130 positioned in engagement with a shoulder 132 formed on the flange 128.

The pins 112 and 114 are secured to the caliper 52 by means of the heads 120 and 130, respectively, and by means of cotter keys or pins 134 and 136, respectively. The pins 112 and 114 are also resiliently mounted in the reduced portions 39 and 40 of the arms 34 and 36, respectively, of the torque plate by means of grommets 140 and 142 which are constructed of an elastomeric material.

The pins 112 and 114 support the brake shoes 101 and 106 by passing through apertures in the backing plates 110 and 104. The pin 112 passes through an aperture 150 in the backing plate 110 and through an aperture 152 in the backing plate 104. Similarly, the pin 114 passes through an aperture 154 in the backing plate 110 and through an aperture 156 in the backing plate 104.

The outwardly extending flanges 118 and 128 positioned on the reaction portion 56 of the caliper 52 have inwardly extending spaced shoulders 160 and 162 that are engageable with outwardly extending edges 164 and 166 positioned on the backing plate 110 of the brake shoe 106 for absorbing the braking torque of the brake shoe 106 when the lining 108 is forced into engagement with the face 22 of the rotatable disk 20 during brake operations.

The arms 34 and 36 of the stationary torque plate 26 have axially extending flanges 172 and 174 in the form of loops formed integrally with the arms 34 and 36, respectively. The axially extending flange 172 has an inwardly facing shoulder 176 positioned thereon, while the flange 174 has an inwardly facing shoulder 178 positioned thereon. The backing plate 104 of the brake shoe 100 has outwardly extending surfaces 180 and 182 positioned thereon that are engageable with the shoulders 176 and 178, respectively, during braking operations for transferring the braking torque from the brake shoe 100 via the backing plate 104 to the stationary torque plate 26, when the brake lining 102 is moved into engagement with the face 24 of the rotor 20 by the piston 60. The two axially extending flanges 172 and 174 in the form of loops provide shoulders of substantial axial extent that provide a means for taking the torque from the first brake shoe 100 and the second brake shoe 106 throughout the life of the linings 102 and 108 as these linings wear.

As previously described, the two flex straps 74 and 76 are positioned adjacent the first brake shoe and more closely adjacent the position where the torque is transferred to the torque plate via the backing plate on the brake shoe motivated by the fluid piston 60. This location of the flex straps provides the advantage that it minimizes the twisting couple on the flex straps that is produced by the engagement of the brake shoes with the braking faces positioned on the rotatable disk 20. Furthermore, it reduces noise and vibration in the disk brake which often cause problems, particularly with respect to customer acceptance of this type of braking mechanism. It can be appreciated also that the flex straps of the invention are of minimum size and are positioned so that the couple closely spaced surfaces on the caliper and torque plate thereby minimizing the amount of material needed for such a flexible strap. The fact that the two planar end portions of the flexible straps are positioned in planes that are closely spaced with respect to each other in an axial direction, also minimizes the twisting of the flex straps that is produced by the twisting couple occurring during braking action.

What is claimed is:

1. A disk brake for braking a rotary disk comprising a stationary member, a caliper member held against rotation by said stationary member and having a fluid motor portion adapted to be positioned on one side of the disk and a reaction portion adapted to be positioned on the other side of the disk, a first brake shoe, said first brake shoe being motivated by said fluid motor portion, a second brake shoe adapted to be disposed between the disk and said reaction portion and motivated by said reaction portion, the braking torque of said first brake shoe being absorbed by one of said members, the braking torque of the second brake shoe being absorbed by said caliper member, said stationary member having a substantially planar mounting surface, said fluid motor portion of said caliper also having a substantially planar mounting surface positioned closely adjacent to said mounting surface of said stationary member in opposed relationship thereto, flexible strap means having a first planar end portion affixed to said substantially planar mounting surface of said stationary member, a second planar end portion affixed to said substantially planar mounting surface of said fluid motor portion of said caliper and intermediate flexible means sandwiched between and coupling said first planar end portion and said second planar end portion.

2. The combination of claim 1 in which said substantially planar mounting surface of said stationary member and of said fluid motor portion of said caliper are generally parallel to the plane of rotation of the disk.

3. The combination of claim 2 in which means are provided on said stationary member engageable with said first brake shoe for absorbing the braking torque therefrom, said substantially planar mounting surface on said fluid motor portion of said caliper and said substantially planar mounting surface on said stationary member being positioned closely adjacent to each other and to said means on said stationary member.

4. The combination of claim 3 in which said stationary member comprises a torque plate having a main body portion disposed generally parallel to the plane of rotation of the disk and in which said means comprise a pair of spaced flanges formed integrally with said main body portion and extending axially inwardly from said main body portion of said torque plate.

5. The combination of claim 4 in which said brake shoe has outwardly facing edges and said flanges have inwardly facing shoulders engageable with the outwardly facing edges on said brake shoe.

6. The combination of claim 5 in which flanges comprise axially generally inwardly extending loops to provide generally U-shaped shoulders that are engageable by said outwardly facing edges on said brake shoe.

7. The combination of claim 1 in which said fluid motor portion of said caliper has a pair of outwardly extending flanges, said stationary member having portions positioned closely adjacent said outwardly extending flanges, said flanges each having a mounting surface positioned in a plane generally parallel to the plane of rotation of the disk, said portions of said stationary member having mounting surfaces positioned in a plane generally parallel to the plane of rotation of the disk and spaced axially inwardly of the mounting surfaces on said flanges, said flexible strap means being secured between said flanges and said stationary member.

8. A disk brake for braking a rotary disk comprising a stationary torque plate, a caliper held against rotation by said stationary member and having a fluid motor portion adapted to be positioned on one side of the disk and a reaction portion adapted to be positioned on the other side of the disk, a first brake shoe, said first brake shoe being motivated by the fluid motor portion, a second brake shoe adapted to be disposed between the disk and said reaction portion and motivated by said reaction portion, said torque plate being positioned between said fluid motor portion of said caliper and the disk, said fluid motor portion having a pair of outwardly extending flanges, a first flexible strap means connected to a surface of one of the flanges adjacent said torque plate and to a mounting surface on said torque plate, a second flexible strap means connected to a surface of the other of said flanges adjacent said torque plate and to a mounting surface on said torque plate, each of said strap means having radially spaced hinge portions.

9. The combination of claim 8 in which said mounting surfaces on said torque plate and the surfaces on said flanges are positioned in planes generally parallel to the plane of rotation of the disk.

10. The combination of claim 9 in which each of said flexible straps has a first planar end portion affixed to a surface of one of said flanges and a second planar end portion affixed to a mounting surface on said torque plate, and an intermediate portion coupled to said planar end portions by hinges having parallel axes.

11. The combination of claim 10 in which the planar end portion of each of said straps affixed to said stationary torque plate is positioned radially inwardly of the other planar end portion and circumferentially outwardly thereof.

12. The combination of claim 11 in which said first brake shoe includes a backing plate engageable with said means provided on said stationary member, said backing plate being positioned in a plane generally parallel to the planes of said mounting surfaces on said torque plate and to the surfaces on said flanges.

13. The combination of claim 12 in which said means provided on said stationary member comprises a pair of flanges formed integrally with said stationary member and extending axially inwardly from said portion of said torque plate positioned generally parallel to the plane of rotation of the disk.

14. The combination of claim 13 in which said flanges comprise axially, generally inwardly extending loops to provide flanges having substantial axial length thereby providing surfaces for taking the torque from said first brake shoe as the lining on said brake shoe wears.

15. The combination of claim 14 in which said stationary member is generally C-shaped and includes a main body portion and two arms extending therefrom, said arms being positioned axially inwardly of said main body portion and in a plane parallel to the plane of the backing plate of the brake shoe motivated by the fluid motor portion of the caliper and spaced closely adjacent thereto with said generally axially inwardly extending loops being positioned in said arms.

References Cited
UNITED STATES PATENTS

| | | | |
|---|---|---|---|
| 2,784,811 | 3/1957 | Butler | 188—73 |
| 3,258,089 | 6/1966 | Hayes et al. | 188—73 |
| 3,260,332 | 7/1966 | Wells | 188—73 |
| 3,269,490 | 8/1966 | Swift | 188—73 |
| 3,299,991 | 1/1967 | De Castellet | 188—73 |
| 3,312,309 | 4/1967 | Sturis | 188—73 |

MILTON BUCHLER, *Primary Examiner.*

GEORGE E. HALVOSA, *Examiner.*